Aug. 29, 1950  R. A. BLOOMQUIST  2,520,523
UNIVERSAL DEVICE FOR SHARPENING HYPODERMIC NEEDLES
Filed Oct. 21, 1947

INVENTOR.
R. A. BLOOMQUIST
BY Chas. R. Fay
ATTORNEYS.

Patented Aug. 29, 1950

2,520,523

UNITED STATES PATENT OFFICE 2,520,523

UNIVERSAL DEVICE FOR SHARPENING HYPODERMIC NEEDLES

Rudolph A. Bloomquist, Auburn, Mass.

Application October 21, 1947, Serial No. 781,156

2 Claims. (Cl. 51—217)

This invention relates to universal devices for sharpening hypodermic needles of all kinds and sizes.

The principal object of the invention resides in the provision of means for holding hypodermic needles in operative relation to a rotary turret head having a plurality of different sized openings for receiving and holding the end of the needle to be sharpened, said openings intersecting a plane tool guiding surface at an angle so that the needle may be sharpened on said angle.

Further objects of the invention reside in the provision of a rotary turret having apertures located generally radially thereof and extending inwardly from the periphery thereof at an angle to a surface of the turret for holding the hypodermic needle ends to be sharpened, said head having sharpening surfaces at different angles so that hypodermic needles may be sharpened at the angle desired and there being sufficient openings to accommodate all of the usual sizes of hypodermic needles.

A still further object of the invention resides in the provision of a device of the class described comprising a base, a rotary turret mounted on said base at an angle thereto, a second turret for holding a hypodermic needle, said second turret being movable to and from the first turret and the second turret having means for holding the hypodermic needle parallel to the base, the first named turret being provided with a series of radially extending openings which are parallel to the base and, therefore, at an angle to the turret for the purpose of accommodating hypodermic needles of various sizes.

Other objects and advantages of the invention will appear hereinafter.

Reference is to be had to the accompanying drawing in which.

Figure 1:
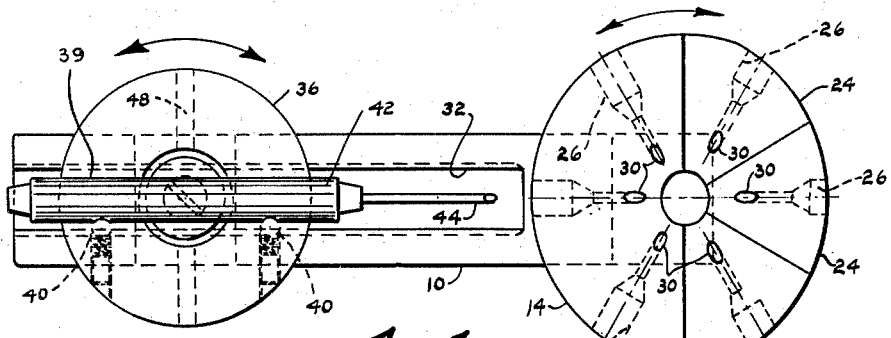
Fig. 1 is a plan view of a device according to the invention.
Figure 2:
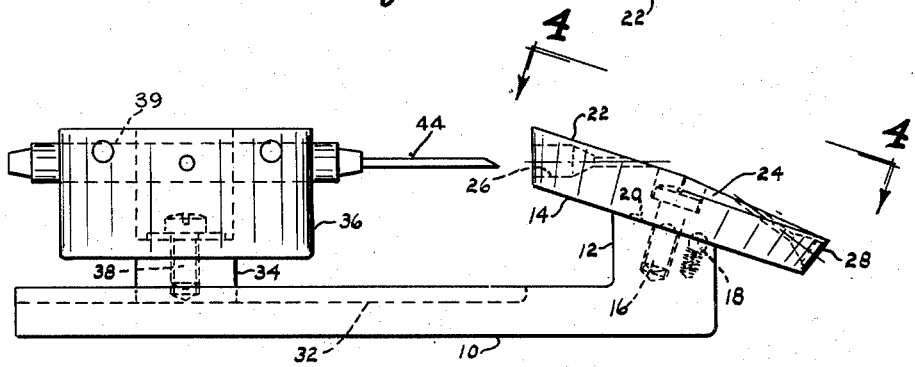
Fig. 2 is a view in side elevation thereof.
Figure 4:
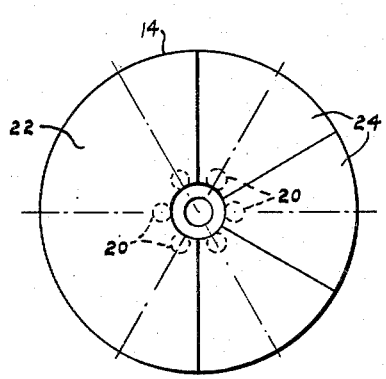
Fig. 4 is a top plan view according to the arrows 4 in Fig. 2.
Figure 3:
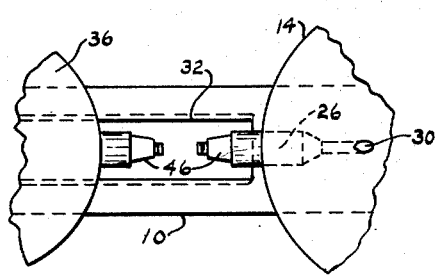
Fig. 3 is a fragmentary view illustrating the use of chucks in the apparatus.

In carrying out the invention there is provided a base 10 adapted to be set on a table or other support and provided at one end with a standard 12, this standard having a plane top surface located at an angle to the base. A rotary turret 14 is adapted to be mounted on the standard 12 by means of a center pin 16. The standard is provided with a spring-pressed ball 18 which is locatable in any one of a series of depressions 20 in the bottom of the turret 14 so as to locate the turret in any one of a plurality of fixed positions.

The turret 14 in the device shown is provided with a top surface 22 covering one-half of the upper surface of the turret and this surface 22 is parallel to the bottom surface of the turret. The remaining half of the top surface of the turret is divided into a plurality of segmental plane surfaces 24, all of which are located at a slight angle to the surface 22, all of these angles being the same or different as desired. The purpose of this construction is to provide the surface 22 at an angle of 18° to a horizontal and the surface 24 at an angle of 12° to the horizontal when the turret is swung around so as to present the surfaces 24 in the uppermost position.

The turret is provided with a series of generally radially arranged openings illustrated at 26, these openings extending from the circumferential surface 28 of the turret and intersecting the angular surfaces 22 and 24 above explained so that each of the openings intersects said surfaces as at 30.

The base 10 is provided with a longitudinal guideway 32 in which is slidably mounted thereon a turret 36 by means of a center pin 38. This turret is provided with a diametrical groove 39 in its top, said groove being intersected by a pair of spring-pressed balls 40 for the purpose of holding and locating a hypodermic needle casing 42 therein. It will be seen that the hypodermic needle casing 42 may be brought up to the turret 14 by sliding the standard 34 in the groove 32 so that the needle 44 is brought up to whichever hole 26 is arranged to receive it. With the hypodermic needle extending slightly through the hole 26 a stone may be moved across the surface 22 or 24 depending upon the angle desired, and the hypodermic needle thereby sharpened.

In some cases it may be desired to sharpen a double ended hypodermic needle in which case pin vises or chucks 46 may be secured in the holes 26 and in a passage 48 in turret 36 so as to hold one needle while the other needle is being sharpened as above described. As well known to those familiar with the art, a double ended hypodermic needle comprises essentially a tube sharpened at each end.

Having thus described my invention and the advantages thereof, I do not wish to be limited to the details herein disclosed otherwise than as set forth in the claims, but what I claim is:

1. A device of the class described comprising a flat base, a hypodermic needle casing holder thereon, a rotatable turret on the base spaced from the holder, said turret having an axis at an angle to the base and tilted away from the holder, there being a needle receiving passage in the turret effective to receive the needle of a hypodermic needle casing in the holder so that the needle is held therein and extends therethrough the passage intersecting the top of the turret and presenting the end thereof to be sharpened with the top of the turret at an angle to the base and the axis of the needle, the top of the turret being divided into a plurality of flat surfaces at angles to each other, there being a passage for each surface, so that the turret may be rotated to the sharpening angle desired for the particular needle to be sharpened.

2. The device of claim 1 including means effective to provide for adjustment of the turret relative to the needle casing holder.

RUDOLPH A. BLOOMQUIST.

REFERENCES CITED

The following references are of record in the file of this patent:

UNITED STATES PATENTS

| Number | Name | Date |
|---|---|---|
| 262,074 | Maltby | Aug. 1, 1882 |
| 2,088,056 | Foster | July 27, 1927 |
| 2,389,069 | Mascarenhas | Nov. 13, 1945 |
| 2,389,679 | Mickelson | Nov. 27, 1945 |
| 2,402,245 | Freeland | June 18, 1946 |

FOREIGN PATENTS

| Number | Country | Date |
|---|---|---|
| 568,414 | Great Britain | Apr. 4, 1945 |